July 3, 1923.

J. W. THROPP 1,460,869

FLEXIBLE COUPLING

Filed Dec. 12, 1921

Inventor-
Joseph W. Thropp.
by his Attorneys.-

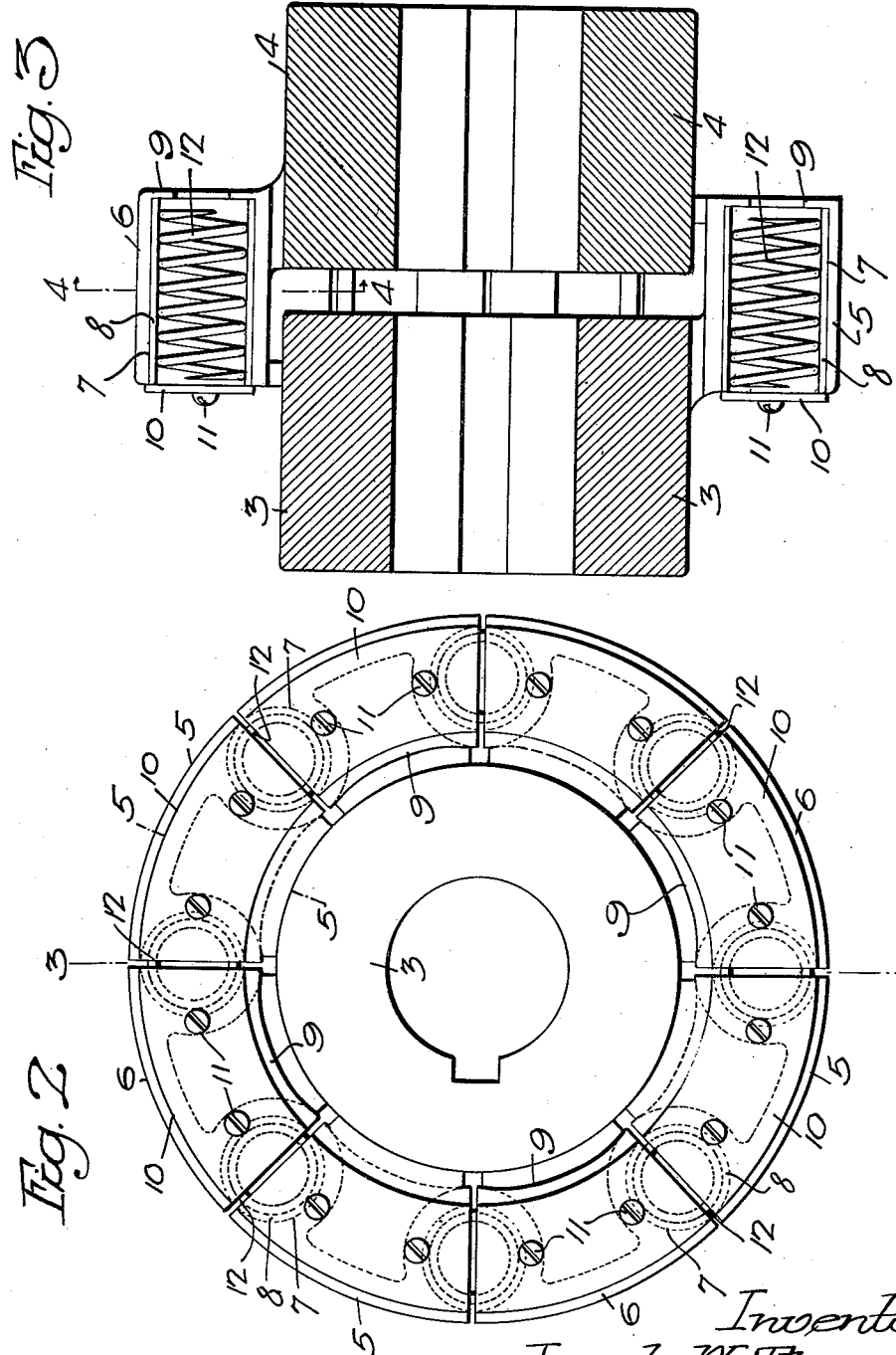

Patented July 3, 1923.

1,460,869

UNITED STATES PATENT OFFICE.

JOSEPH W. THROPP, OF TRENTON, NEW JERSEY.

FLEXIBLE COUPLING.

Application filed December 12, 1921. Serial No. 521,854.

*To all whom it may concern:*

Be it known that I, JOSEPH W. THROPP, a citizen of the United States, residing in Trenton, New Jersey, have invented certain Improvements in Flexible Couplings, of which the following is a specification.

One object of my invention is to construct a flexible coupling in such a manner that one shaft can move out of line with the other shaft and to utilize the flexibility of coiled springs to drive one member of the coupling yieldingly from the other.

A further object of the invention is to construct the coupling so that the pressure will be taken by the sides of the coiled springs, the springs elongating as lateral pressure is applied.

In the accompanying drawings:

Fig. 2 is an end view;

Fig. 3 is a sectional view on the line 3—3; Fig. 2;

Figure 1:
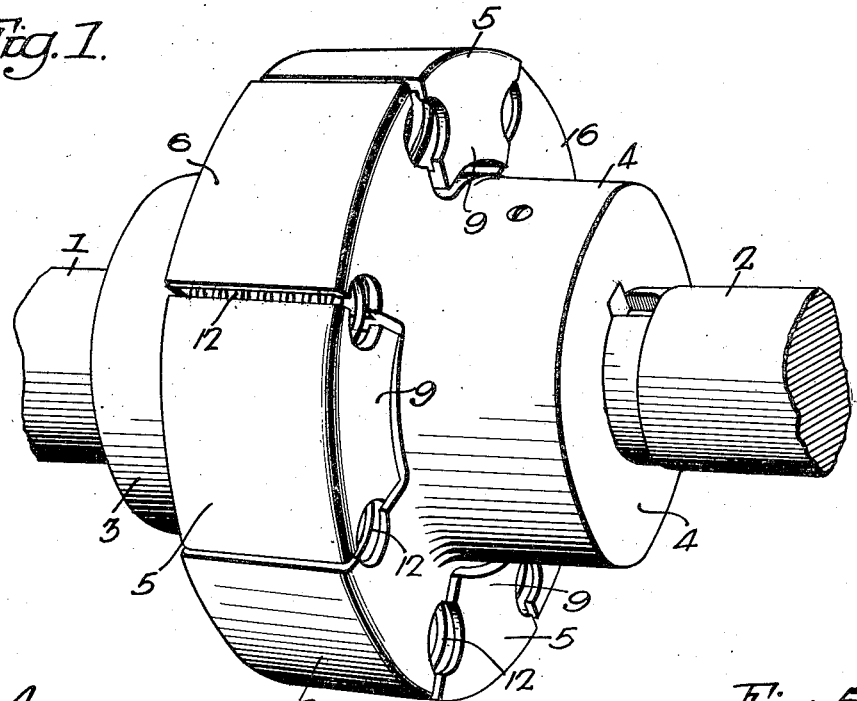
Fig. 1 is a perspective view of my improved flexible coupling.
Figure 4:
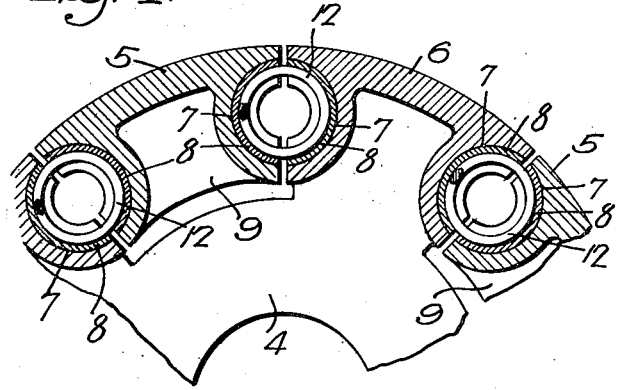
Fig. 4 is a sectional view on the line 4—4, Fig. 3.
Figure 5:
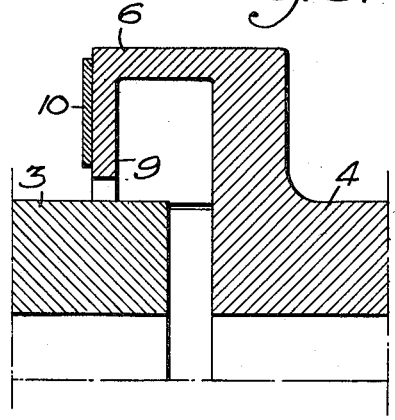
Fig. 5 is a sectional view on the line 5—5, Fig. 2.

Referring to the drawings, 1 is the driving shaft and 2 is the driven shaft. 3 is a hub keyed to the driving shaft and 4 is a hub keyed to the driven shaft. 5 are jaws, which are spaced apart and which project from the hub 3. 6 are similar jaws which project from the hub 4 and into the spaces between the jaws 5. Each jaw has a recess 7 in each driving face and, in the present instance, located within each recess are half bushings 8 although, in some instances, these bushings may be omitted. At one end of each jaw is an internal flange 9, which projects from the wall of the bearing face, as shown. On the upper end of each jaw is a plate 10 held in place by screws 11, or other fastenings. These plates extend over the ends of the recesses, as shown in Fig. 2. Located within each cylindrical chamber formed by two adjoining recesses is a coiled spring 12. These springs are less in length than the distance between the flange 9 and the plate 10 so that the springs can elongate when lateral pressure is applied.

It will be noticed that the two sets of jaws are spaced a given distance apart and are clear of the opposite hub. The springs are the yielding connections between the jaws of the coupling. This construction allows one shaft to become out of line with the other without interfering with the drive.

When one hub is driven by another, pressure is exerted on the sides of the springs or on lines at right angles to the longitudinal axis of the springs so that there is a crushing action causing elongation of the springs when pressure is applied.

This construction is substantial and the parts can be readily assembled.

I claim:

1. The combination in a flexible coupling, of two hubs, each having a series of jaws, the jaws of one hub alternating with those of the other hub, the bearing faces of each jaw having longitudinal recesses therein; coiled springs located in the recesses between the jaws; removably positioned means for retaining the springs in the recesses, the longitudinal center of the spring being so related to the center line of the coupling that the springs, when pressure is applied, will be compressed on lines at right angles to the longitudinal line of the springs.

2. The combination in a flexible coupling, of two hubs, each hub having a series of jaws, the jaws of one hub alternating with those of the other hub, each jaw having a recess in each driving face; springs located in the recesses between the jaws; removably positioned means for retaining the springs in the recesses, the longitudinal center line of each spring being parallel with the center line of the coupling, the springs being less in length than the depth of the recesses so that when lateral pressure is applied to the springs they will be free to elongate.

3. The combination in a flexible coupling, of two hubs, a series of jaws on each hub, the jaws being spaced apart, the jaws of one hub extending into the spaces between the other jaws; a longitudinal, segmental recess in the driving face of each jaw; a segmental bushing in each recess; a flange at one end of each recess; a detachable plate on each jaw extending over the recess; and a coiled spring located in the chamber formed by the two recessses of opposing jaws, each spring being less in length than the depth of the chamber so that the springs are free to elongate when lateral pressure is applied by the jaws.

JOSEPH W. THROPP.